United States Patent
Chockalingam et al.

(10) Patent No.: US 10,057,830 B2
(45) Date of Patent: Aug. 21, 2018

(54) HANDOVER BETWEEN CELLS BASED ON SIGNAL QUALITY AND INTERFERENCE ESTIMATION

(71) Applicant: Apple Inc., Cupertino, CA (US)

(72) Inventors: Karthik Chockalingam, Santa Clara, CA (US); Sai Sravan Bharadwaj Karri, Santa Clara, CA (US); Swaminathan Balakrishnan, Sunnyvale, CA (US); Sachin J. Sane, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/633,033

(22) Filed: Jun. 26, 2017

(65) Prior Publication Data
US 2018/0035345 A1  Feb. 1, 2018

Related U.S. Application Data

(62) Division of application No. 14/872,065, filed on Sep. 30, 2015, now Pat. No. 9,693,281.

(60) Provisional application No. 62/172,184, filed on Jun. 7, 2015.

(51) Int. Cl.
*H04W 36/30* (2009.01)
*H04W 36/00* (2009.01)

(52) U.S. Cl.
CPC ....... *H04W 36/30* (2013.01); *H04W 36/0055* (2013.01); *H04W 36/0088* (2013.01)

(58) Field of Classification Search
CPC .......................... H04W 36/30; H04W 36/0055
See application file for complete search history.

(56) References Cited

U.S. PATENT DOCUMENTS

| | | | | |
|---|---|---|---|---|
| 2009/0257356 | A1* | 10/2009 | Frederiksen | H04W 72/1231 370/252 |
| 2010/0061311 | A1* | 3/2010 | Wang | H04W 72/085 370/329 |
| 2012/0099452 | A1 | 4/2012 | Dai et al. | |
| 2016/0360462 | A1 | 12/2016 | Chockalingam et al. | |

* cited by examiner

*Primary Examiner* — Christopher M Brandt
(74) *Attorney, Agent, or Firm* — Dickinson Wright RLLP (57) ABSTRACT

Method and apparatus to trigger a handover of a mobile device from a serving cell to a neighbor cell based on signal quality are disclosed. The mobile device measures signal strength and signal quality for the serving cell. When the signal strength exceeds a network-defined threshold and the signal quality falls below a mobile device defined threshold, the mobile device measures at least one neighbor cell. When a neighbor cell exceeds the network-defined threshold for signal strength and also meets the mobile device defined signal quality threshold, the mobile device sends a measurement report to the serving cell to trigger the handover. The measurement report includes modified values that indicate the serving cell does not meet network-defined threshold values and that the neighbor cell outperforms the serving cell.

20 Claims, 8 Drawing Sheets

HANDOVER BETWEEN CELLS BASED ON SIGNAL QUALITY AND INTERFERENCE ESTIMATION

CROSS-REFERENCE TO RELATED APPLICATIONS

This application is a division of U.S. application Ser. No. 14/872,065, filed Sep. 30, 2015, entitled "HANDOVER BETWEEN CELLS BASED ON SIGNAL QUALITY AND INTERFERENCE ESTIMATION," which claims the benefit of U.S. Provisional Application No. 62/172,184 filed Jun. 7, 2015 of the same title, the contents of both of which are incorporated by reference herein in their entirety for all purposes.

FIELD

The described embodiments generally relate to wireless communications, including, methods and apparatus for handover of wireless devices between cells based on signal quality and interference estimation.

BACKGROUND

Fourth generation (4G) cellular networks employing newer radio access technology (RAT) systems that implement the $3^{rd}$ Generation Partnership Project (3GPP) Long Term Evolution (LTE) and LTE Advanced (LTE-A) standards are rapidly being developed and deployed within the United States and abroad. Many different types of 4G LTE-compliant communication devices have been introduced into the consumer electronic device marketplace. LTE/LTE-A wireless networks offer high throughput data services and packetized voice services, e.g., voice over LTE (VoLTE). Many 4G wireless communication devices are capable of communicating within heterogeneous telecommunication networks that use a mixture of 4G, third generation (3G), and second generation (2G) RAT systems. Accordingly, these multi-mode wireless communication devices are configured with radio frequency (RF) wireless circuitry that allows the wireless communication devices to readily transition between cells of a LTE/LTE-A network, as well as to transition to cells of 3G and 2G legacy networks. By way of example, 3G legacy RATs may include Universal Mobile Telecommunications System (UMTS)/High Speed Packet Access (HSPA) and Code Division Multiple Access (CDMA) 2000/1× Evolution-Data Only (1× EV-DO) systems, whereas 2G legacy RATs can include Global System for Mobile Communications (GSM)/Enhanced Data Rate for GSM Evolution (EDGE) systems.

Generally, multi-mode wireless communication devices are configured to prefer communication via 4G LTE/LTE-A networks offering relatively high data-rate throughput, as opposed to, communication via 3G or 2G legacy wireless networks that offer substantially lower data-rate throughput. In certain scenarios, such as when an LTE/LTE-A network cell may be heavily loaded or in geographic areas with substantially overlapping cells, the LTE/LTE-A network cell may provide a strong signal but a lower signal quality in the downlink direction to a wireless communication device or in the uplink direction from the wireless communication device to the LTE/LTE-A network cell. As most LTE/LTE-A wireless networks are configured to transition wireless communication devices between cells based on signal power levels rather than signal quality levels, a wireless communication device can experience poor connection quality such as low throughput data rates, connection instability, and poor VoLTE audio quality, which can be perceptible for a user of the wireless communication device, despite having a relatively high signal strength, as the signal quality in the uplink direction, downlink direction, or both can be lower than required to support a high data throughput and/or stable connection.

Accordingly, there is a need for transitioning a wireless communication between cells to provide for stable communication based on measured and/or estimated signal quality.

SUMMARY

Method and apparatus for triggering a handover of a mobile device from a serving cell to a neighbor cell based on signal quality are disclosed. While connected to the serving cell of a 4G Long Term Evolution (LTE) network, the wireless communication device receives high signal strength, e.g., based on a reference signal received power (RSRP), but low signal quality, e.g., based on a signal-to-interference-plus-noise ratio (SINR). The low SINR can occur in the downlink direction or in the uplink direction and result from increased interference due to signals from neighbor cells that overlap with signals from the serving cell and/or from parallel transmissions to other mobile devices that share the same frequency spectrum. The mobile device measures downlink performance, e.g., RSRP and SINR, and when the serving cell satisfies a network-defined signal strength threshold for handover, such as an A2 event, (e.g., RSRP exceeds the A2 signal strength threshold) but does not satisfy a mobile device defined signal quality threshold, (e.g., SINR does not exceed a mobile device defined threshold), the mobile device measures at least one neighbor cell. The mobile device computes a channel quality metric for the serving cell and for the at least one neighbor cell and compares the cells based on the computed channel quality metric. The channel quality metric computed for each cell can include a computed SINR across all subcarriers and a measured of cell loading. When the mobile device identifies a neighbor cell that offers higher channel quality than the serving cell, the mobile device modifies values of measurement reports sent to the serving cell of the eNodeB to trigger a handover to the neighbor cell. Representative values in measurement reports that are modified include values that indicate an A3 event condition for handover from the serving cell to the neighbor cell are met. In some embodiments, the mobile device measures SINR on resource elements that carry reference symbols from the serving cell or from the neighbor cell and interpolates the SINR to a range of resource elements across multiple resource blocks spanning an averaging time interval. In some embodiments, the mobile device estimates the SINR based on decoding the reference symbols to provide a more accurate estimate of SINR than by measuring a composite signal power and interference-plus-noise power alone.

Methods and apparatus for adjusting uplink transmissions from a mobile device to a serving cell in the presence of uplink interference at the serving cell are disclosed. The mobile device estimates a block error rate (BLER) at the serving cell for uplink transmissions based on acknowledgement (ACK) and negative acknowledgement (NACK) responses to uplink data transmissions. The mobile device maps the BLER to an SINR and using an estimated transmit signal power derives an estimate of uplink interference at the serving cell for uplink data transmissions from the mobile device to the serving cell. The mobile device determines a set of supportable uplink parameters, such as transport block size (TBS) and modulation and coding scheme (MCS) values based on achieving a target BLER, e.g., less than 1%. The mobile device adjusts power headroom report (PHR) values and/or buffer status report (BSR) values sent to the serving cell to result in scheduled grants that include TBS values and/or MCS values that more closely match the determined supportable uplink parameters to achieve the target BLER for uplink transmissions from the mobile device to the serving cell.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

References are made in this section to the accompanying figures, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one or more consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE network, an LTE Advanced (LTE-A) wireless network, and/or a 5G or other present or future developed advanced cellular wireless network.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or as an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. In some embodiments, the wireless communication device can include a Bluetooth® (or more generically a WPAN) wireless communication subsystem or radio that can implement a Bluetooth wireless communication protocol, such as developed and published by the Bluetooth Special Interest Group (SIG).

In various implementations, a UE that complies with multiple, different communication protocols can operate as a multi-mode device by communicating within a 4G network cell employing a LTE or LTE-A radio access technology (RAT), as well as within a 3G or 2G network cell employing a legacy RAT. In some scenarios, a corresponding multi-mode communication device can be configured to prefer attachment to an LTE network offering faster data rate throughput, particularly for data connections, as compared to 3G or 2G legacy networks offering lower data rate throughput. In some implementations, when connections via a cell of a 4G LTE network at the present location of the UE are poor or unstable, e.g., based on monitoring properties of channels, connections, and/or network cell loading for communication with the 4G LTE network, the UE may be configured to modify reports sent to an enhanced Node B (eNodeB) of the 4G LTE network to trigger a handover to another cell of the 4G LTE network or to a cell of a 3G or 2G legacy network.

A UE connected to a cell of a 4G LTE network can experience low data throughput, connection instability, VoLTE call drops, and poor VoLTE audio quality when signal strength from the cell of the 4G LTE network is strong, e.g., above a network-defined signal strength threshold used for measurement reporting that affects handover decisions by network elements, such as an eNodeB, of the 4G LTE network. A representative signal strength threshold is a reference signal received power (RSRP) threshold as used for measurement reporting events, such as A2 and A3, in an LTE/LTE-A wireless communication protocol. In some scenarios, the UE can receive adequate signal strength, as measured by RSRP levels, but may also experience a high level of interference in the downlink direction (e.g., from neighbor cells that transmit on the same frequencies and resource elements that carry the reference signals for measuring RSRP) and/or in the uplink direction (e.g., from other UEs communicating with the same cell or with neighbor cells). Particularly in high density urban environments, the level of interference at a UE and/or at the cell, e.g., when heavily loaded with multiple UEs, can be quite high. The RSRP measured by the UE, which measures power received on certain designated resource elements of resource blocks, can include both reference signal power from a serving cell and interference power from overlapping neighbor cells. As a result interference power from neighbor cells can add to the RSRP measurement. The interference from neighbor cells can also degrade decoding of signals from the serving cell. Interference from neighbor cells can occur when certain physical layer channels, such as the physical downlink shared channel (PDSCH) of two adjacent cells overlap in frequencies used. In some scenarios, both the UE can experience poor connection quality due to overlap between signals of a neighbor cell and a serving cell, whether connected to the serving cell or the neighbor cell. As such, finding and handing over the UE to a neighbor cell on which signal quality (and therefore a connection) is estimated to be above a UE-defined threshold can be preferred to remaining on a serving cell with high levels of interference, event though signal power measurements indicate that the serving cell may be adequate.

Rather than depend solely on the RSRP measurements, the UE can also estimate a signal-to-interference-plus-noise ratio (SINR), which can be defined as total power from signals of interest divided by the sum of interference power from interference signals and from background noise. Poor SINR can provide a more accurate estimate of when a connection quality may be suspect, and the UE can modify measurement reports sent to the eNodeB of the serving cell to trigger a handover to a neighbor cell when the neighbor cell is estimated to have better SINR and provide a better connection for the UE. Preferably, the UE switches from using a cell with good RSRP and poor SINR to a cell with good RSRP and good SINR.

Handover in 4G LTE/LTE-A networks is based on RSRP measurements provided by the UE to the eNodeB of the serving cell to which the UE is connected. A UE may be unable to handover to a neighbor cell when the RSRP of the serving cell exceeds a network-defined signal strength threshold, e.g., an A2 threshold, which can be set to −105 dBm. Unless the UE measures an RSRP below the network-defined signal strength threshold, a measurement report will not be sent to the eNodeB (at least based on an A2 event). In some embodiments, the network also defines a hysteresis level, e.g., one dB, to avoid having the UE switch repeatedly between cells operating near the A2 threshold level. Thus, with the hysteresis value included, the UE can sent a measurement report indicating an A2 event when the measured RSRP falls below −106 dBm. With high interference levels, the SINR may be low (e.g., at or below −5 dB), resulting in poor connection quality, event though the measured RSRP may exceed the A2 threshold plus hysteresis level, e.g., at −100 dBm. The UE, in this scenario, remains on the serving cell rather than being handed over to a neighbor cell by the eNodeB, even though there may be other neighbor cells (e.g., within the same frequency band) having a similar RSRP but with a better SINR (e.g., at or above 5 dB). A 10 dB difference in SINR can impact a connection quality substantially. The neighbor cell can provide a better connection for the UE than the serving cell, but may the UE may be unable to handover to the neighbor cell as the measurement reporting event does not provide for using SINR rather than RSRP, at least in some 4G LTE/LTE-A networks. In addition, with a dual (or multiple) receiver UE, measurements of neighbor cells in other frequency bands can also be undertaken by the UE, and an inter-frequency handover can be triggered when a neighbor cell is identified that may provide a more stable connection and higher audio quality (for a VoLTE connection), when the UE experiences low SINR in the serving cell.

In some embodiments, a wireless communication device, e.g., a UE, connected to a serving cell of a 4G LTE/LTE-A network performs a handover method based on SINR. The UE measures the RSRP and the SINR of the serving cell. When the RSRP of the serving cell falls below a network-defined signal strength threshold, e.g., the A2 event threshold, the UE sends a measurement report indicating that the RSRP of the serving cell is below the network-defined signal strength threshold and follows a normal procedure for handover (under direction of the eNodeB of the serving cell) to another cell. When the RSRP of the serving cell does not fall below the network-defined signal strength threshold, the UE measures an SINR of the serving cell. When the SINR of the serving cell does not fall below a UE-defined signal quality threshold, then the UE remains on the serving cell, as both the RSRP and the SINR of the serving cell are adequate for providing a quality connection for the UE. When the SINR of the serving cell falls below the UE-defined signal quality threshold, the UE measures a set of neighbor cells. Using measurements from both the serving cell and neighbor cells, the UE computes a channel quality for the serving cell and for the neighbor cells. A representative channel quality for a cell can be both a measured signal strength for the cell, e.g., the RSRP, and a measured signal quality, e.g., the SINR. When a neighbor cell has better channel quality that the serving cell, e.g., the neighbor cell's RSRP exceeds the network-defined signal strength threshold and the neighbor cell's SINR exceeds the UE-defined signal quality threshold, the UE can send a modified measurement report to the eNodeB of the serving cell to trigger a handover from the serving cell to the neighbor cell. The UE can modify values for the downlink channel quality reported to the eNodeB, e.g. the reported RSRP of the serving cell falling below the network-defined threshold or another channel quality indicator (CQI) value, so that the eNodeB will handover the UE from the serving cell to the neighbor cell.

In some embodiments, the UE can account for an A3 event condition that triggers a handover from the serving cell to a neighbor cell. The A3 event condition can be defined by the 4G LTE/LTE-A network and can include a cell-specific offset for the serving cell ($O_{serv,cell}$), a frequency-specific offset for the serving cell ($O_{serv,freq}$), a cell-specific offset for the neighbor cell ($O_{neigh,cell}$), a frequency-specific offset for the neighbor cell ($O_{neigh,freq}$), a hysteresis value (Hyst), and an overall offset value (Offset). The A3 event can be triggered when the neighbor cell is better than the serving cell at least by the overall offset value (accounting for the other offsets and hysteresis according to the following equation.)

$$RSRP_{neigh}+O_{neigh,cell}+O_{neigh,freq}-\text{Hyst} > RSRP_{serv}+O_{serv,cell}+O_{neigh,cell}+\text{Offset}$$

The UE can derive values for reporting the RSRP of the serving cell and the neighbor cell to indicate to the eNodeB that the condition for the A3 event is true. The UE can provide the modified measurement report when the signal quality, e.g., the SINR of the neighbor cell exceeds the UE-defined signal quality threshold (to ensure selecting an adequate neighbor cell to which to handover. The eNodeB of the 4G LTE/LTE-A network will trigger a handover causing the UE to handover to the neighbor cell, while maintaining any active connections, which should have improved channel quality and therefore more stable connection, lower error rates, higher audio quality, etc.

In some embodiments, the SINR is measured over a set of resource blocks for both the serving cell and for neighbor cells. Reference signals are transmitted by both the serving cell and neighbor cells in multiple resource blocks within a pattern of resource elements across different subcarrier frequencies in successive time-domain symbols. The SINR for a cell can be measured using reference signals on particular resource elements and by interpolating for other resource elements (on which data and not reference signals are transmitted). The SINR can be averaged over a time interval, e.g., forty milliseconds, to provide an average SINR. Interference can be measured on the resource elements on which the reference signals are received and can be based on information provided from decoding of the reference signals, which can provide more accurate estimates of interference on the resource elements that a simple power summation would provide. An SINR for each resource element, including interpolated to resource elements that do not carry reference symbols, can be calculated and then combined to determine a composite SINR for the serving cell. Similarly a composite SINR for each neighbor cell can be calculated by the UE.

The UE can use SINR measurements to determine a channel quality indicator (CQI) reported to the eNodeB, which can influence the modulation and coding scheme (MCS) selected by the eNodeB for downlink transmission to the UE. CQI reporting from the UE to the eNodeB can include precoding matrix indicator (PMI) and rank indicator (RI) values. Higher CQI values reported by the UE can result in higher MCS values being assigned to the UE. The UE can account for the estimated SINR and a target maximum block error rate (BLER), e.g., BLER<10%, when reporting CQI to the eNodeB. The SINR can provide a better estimate of what data rates and stability a connection can provide rather than a signal strength, such as the RSRP, alone.

In some embodiments, a connection for a wireless communication device, e.g., a UE, connected to a serving cell of an eNodeB of a 4G LTE/LTE-A network can be limited by uplink interference. While cell edge conditions can be detected based on an estimate of downlink communication path loss from the serving cell to the UE, uplink interference can be estimated at the serving cell, e.g., based on information measured and communicated between eNodeBs through an X2 interface, such as a high interference indicator (HII) and overload indicator (OI), and this information may not be available at the UE. While the serving cell can directly measure the uplink performance, e.g., based on an error rate for uplink data received and decoded at the serving cell, the UE can only indirectly observe uplink performance, e.g., based on reception of negative acknowledgements (NACKs) received from the serving cell in response to uplink data packet transmission. In some embodiments, the UE can estimate uplink interference and adjust report parameters sent to the serving cell to result in scheduled grants of data that can meet a target block error rate (BLER) for uplink data communication from the UE to the serving cell. The UE can estimated an uplink BLER based acknowledgements (ACKs) and NACKs received in response to uplink data transmissions. The UE can map an estimated uplink BLER to an estimated received SINR at the serving cell using a pre-stored symbol error probability table. As the UE can know the uplink transmit power used and can determine an estimate of the communication path loss from the UE to the serving cell, the UE can estimate a received power level for uplink transmissions at the serving cell and therefore also derive a combined noise-plus-interference estimate at the serving cell from the estimated received SINR. The UE can determine supportable uplink parameters (e.g., a range of supportable values) for a transport block size (TBS) and modulation and coding scheme (MCS) based on a target BLER, e.g., to achieve a BLER of less than 1%. The UE can determine adjust values of a power headroom report (PHR) and a buffer status report (BSR) sent to the serving cell of the eNodeB to result in scheduled grants, received from the serving cell of the eNodeB in response to scheduling requests, which include TBS and MCS values that more closely match the determined supportable uplink parameters to achieve the target BLER for uplink transmissions to the serving cell of the eNodeB.

Figure 1:
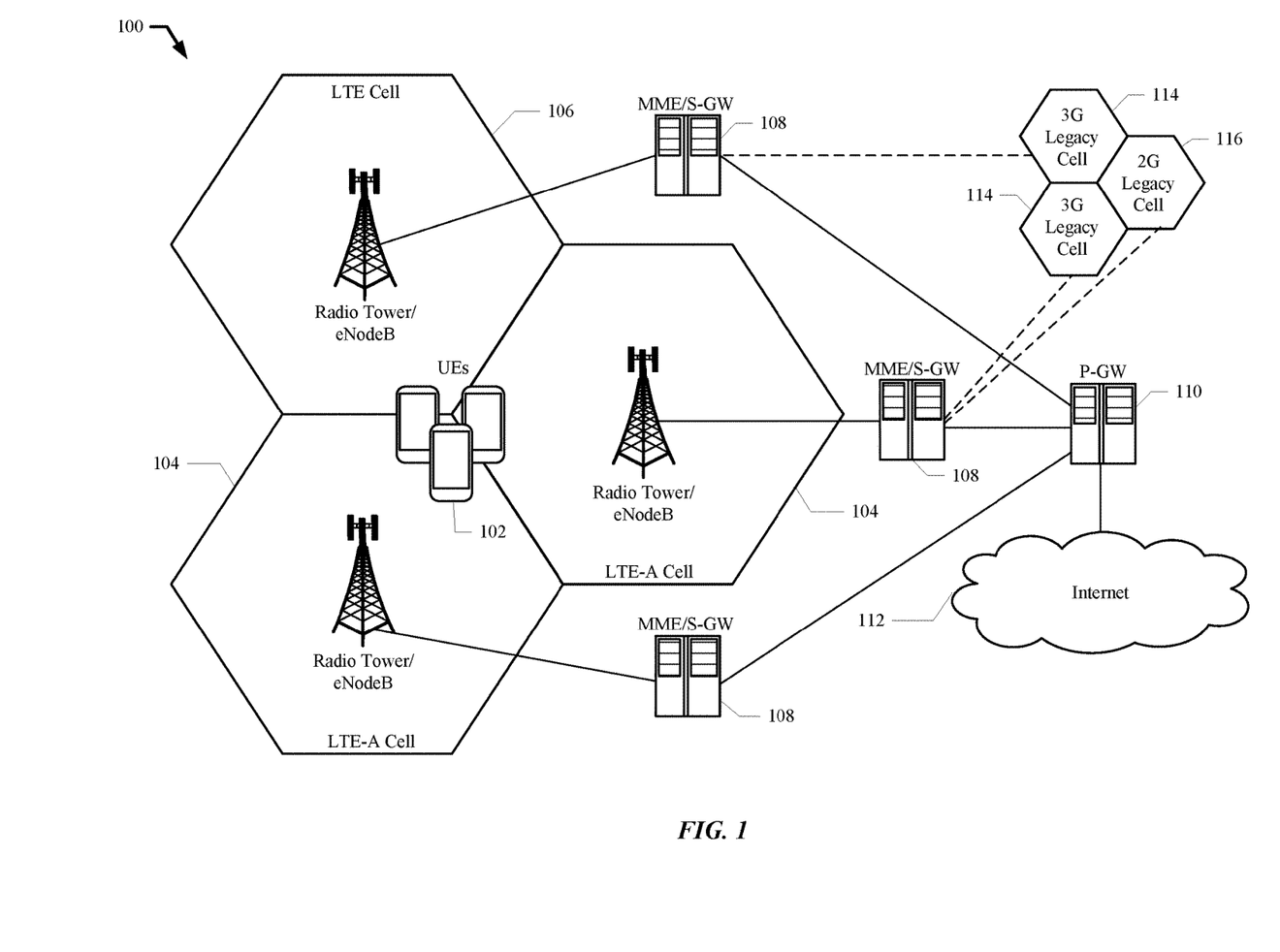
FIG. 1 illustrates a wireless communication system including a mixture of 4G Long Term Evolution (LTE), LTE-Advanced (LTE-A), 3G legacy, and 2G legacy network cells that support multiple user equipment (UE) devices that may be configured to perform various functions, in accordance with some embodiments.

FIG. 1 illustrates a heterogeneous wireless communication system 100 that complies with a 3GPP Evolved Universal Terrestrial Radio Access (E-UTRA) air interface, and includes, but is not limited to, LTE network cells 106 and LTE-A network cells 104, each having enhanced NodeB (eNodeB) base stations that can communicate between and amongst each other via an X2 interface. Further, the heterogeneous, E-UTRA-compliant wireless communication system 100 can include a number of mobility management entities (MMES) 108, serving gateways (S-GWs) 108, PDN gateways (P-GWs) 110, etc., which, as part of the evolved packet core (EPC), can communicate with the eNodeBs of the LTE and LTE-A cells 104/106, via an S1 interface.

In some embodiments, the heterogeneous wireless communication system 100 may also comply with any number of 3G or 2G air interfaces, and as such, the heterogeneous wireless communication system 100 can include 3G legacy network cells 114 and/or 2G legacy network cells 116. Additionally, the heterogeneous wireless communication system 100 may include multiple UEs 102 that may be respectively provided wireless communications service by LTE network cells 106 and LTE-A network cells 104, as well as by 3G legacy network cells 114 and/or 2G legacy network cells 116, at any particular time based in part on a corresponding geographic location of a UE 102 operating within the heterogeneous wireless communication system 100.

Figure 2:
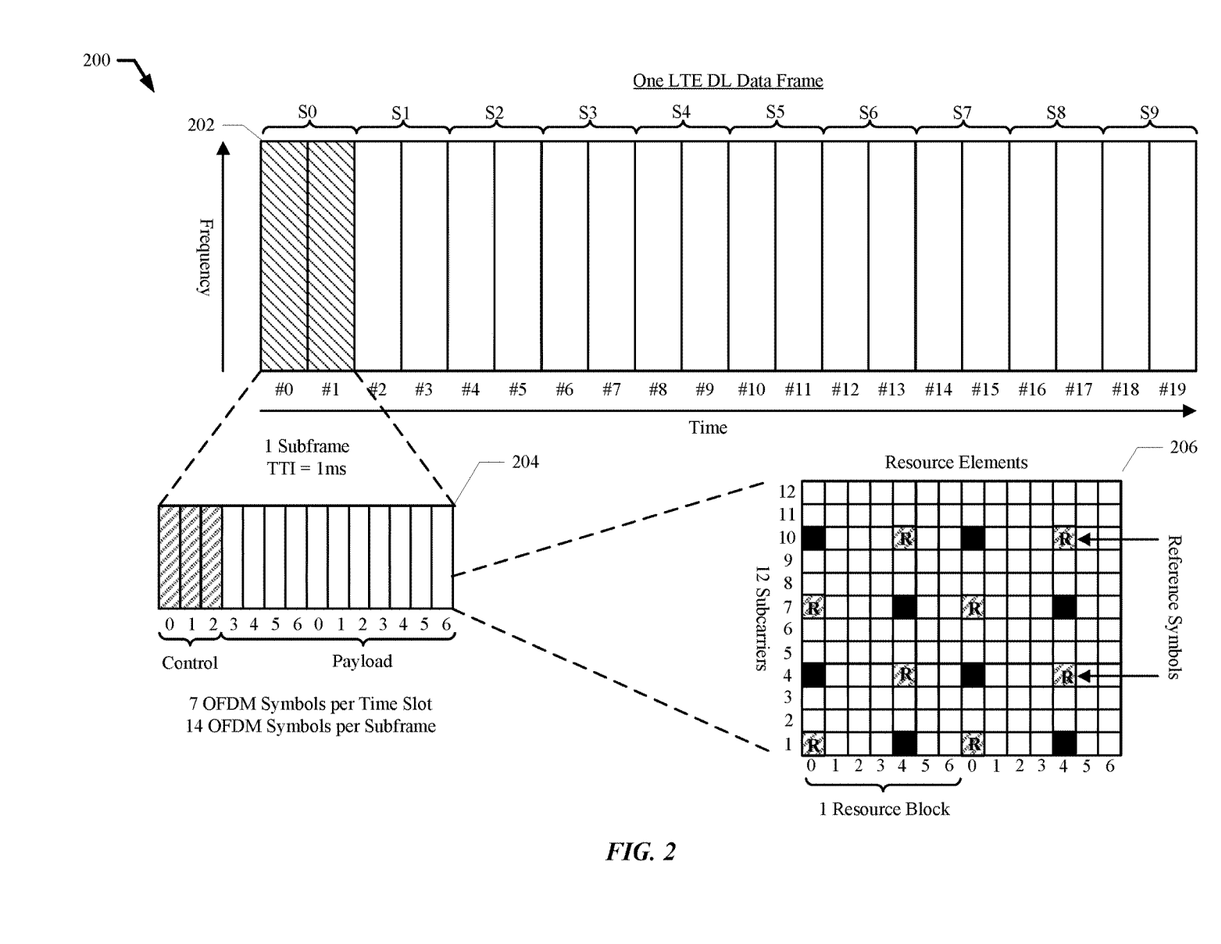
FIG. 2 illustrates a block diagram depicting a single LTE downlink (DL) data frame including a subframe-level resource block characterization having DL reference symbols that can be measured by a UE to determine a reference signal received power (RSRP) of a network base station, in accordance with some embodiments.

FIG. 2 illustrates a block diagram 200 depicting a single LTE data frame structure 202 in accordance with various implementations of the disclosure. As would be understood by those skilled in the art, one LTE data frame 202 includes ten subframes, labeled S0 through S9 in FIG. 2, each subframe spanning a transmission time interval (TTI) of one ms. An LTE subframe is further composed of two time slots, each time slot spanning a TTI of 0.5 ms. Accordingly, there are twenty time slots, labeled #0 through #19, within each LTE data frame 202. A first subframe 204, labeled S0, of the LTE data frame 202 may be composed of fourteen orthogonal frequency division multiplexing (OFDM) symbols, which equates to seven OFDM symbols per time slot, #0 and #1, of the first subframe 204 of the LTE data frame 202.

A first portion of the OFDM symbols (e.g., the first three OFDM symbols) of the first subframe 204 may be designated for control signaling information, and the remaining portion of the OFDM symbols of first subframe 204 may be designated for payload data. It should be understood that the number of OFDM symbols in each of the LTE subframes, S0 through S9, can vary depending on a length of a corresponding cyclic prefix (CP). The CP can be transmitted before each OFDM symbol in each subcarrier in the time domain to prevent inter-symbol interference (ISI) due to multipath.

In LTE, the CP may correspond to either a normal CP having a duration of five or an extended CP having a duration of seventeen µs. Therefore, an LTE time slot employing a normal CP will have seven OFDM symbols; whereas, an LTE time slot employing an extended CP (e.g., intended for use in larger suburban cells in which longer ISI may occur) will have six OFDM symbols. An LTE resource block (RB) is associated with twelve OFDM subcarriers transmitting for the duration of one LTE time slot. Accordingly, a normal RB (associated with a normal CP) transmitting for 0.5 ms. will include a total of eighty-four OFDM symbols (twelve subcarriers×seven OFDM symbols) or resource elements (REs). Likewise, an extended RB (associated with an extended CP) transmitting for 0.5 ms. will include a total of seventy-two REs (twelve subcarriers×six OFDM symbols).

Further, a portion of each LTE subframe (e.g., S0) can be mapped to a time-frequency grid that consists of two RBs 206, which are respectively composed of twelve consecutive LTE subcarriers over the duration of seven OFDM symbols (symbols #0 to #6). An eNodeB can schedule a transmission for each RB during the duration of one time slot (lasting 0.5 ms). Each RB can consist of either eighty-four resources elements (REs) for normal CP or seventy-two REs for extended CP. An RE can be considered the smallest scheduled data unit in LTE and consists of one OFDM subcarrier during one OFDM symbol interval. Additionally, multiple reference symbols (RSs) are included within the subframe time-frequency grid 206 to facilitate physical layer measurements and channel estimation by the UE 102. The data communicated on the RSs can be known in advance to the UE 102 and used to determine one or more performance metrics, such as reference signal received power (RSRP) and/or received signal strength indicator (RSSI).

Figure 3:
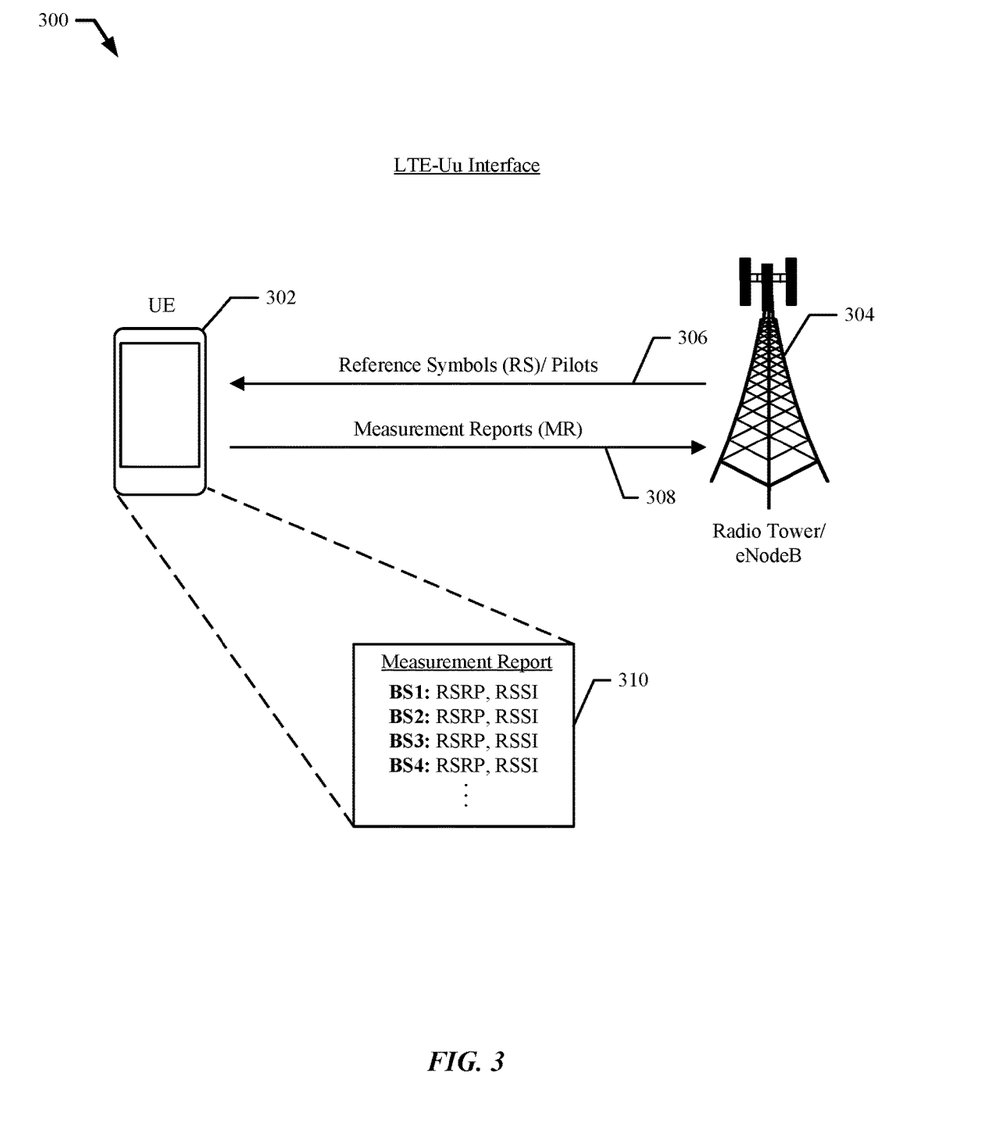
FIG. 3 illustrates a network diagram showing network measurement and reporting procedures between a UE and an eNodeB over the LTE-Uu air interface, in accordance with some embodiments.

FIG. 3 illustrates a network diagram 300 depicting various network device signaling, measurement, and reporting procedures between a UE 302 and an eNodeB 304 (e.g., via the LTE-Uu interface), in accordance with some embodiments of the disclosure. It should be understood that the eNodeB 304 and the UE 302 depicted in FIG. 3 may include the eNodeBs in the LTE/LTE-A network cells 104/106 and the UE 102 illustrated in FIG. 1. The eNodeB 304 can schedule various LTE DL data communications over any number of subframe time slots, in accordance with the resource element time-frequency resource mapping 206 of FIG. 2.

The LTE DL communications can include various RSs, or pilot signals, 306 with which the UE 302 can measure using wireless circuitry signals and/or noise/interference and estimate various physical layer (or other "lower" layer) performance metrics for a communication channel between the UE 302 and the eNodeB 304. The UE 302 can provide information to the eNodeB 304, such as measurement reports 308, based on the measurements, and the eNodeB 304 can respond, under certain network conditions, to adjust communication with the UE 302. In some embodiments, when measurement reports 308 indicate that performance metrics fall below a threshold for reselection (when the UE 302 is in an idle state) and/or handover (when the UE 302 is in a connected state), the eNodeB 304 (in conjunction with additional network elements of an LTE/LTE-A network) can transfer the UE 302 from a cell of the current serving eNodeB 304 to another cell, which can be part of the same eNodeB 304 or a cell of another eNodeB 304 of the LTE/LTEA network (or to a cell of another wireless network, such as to a cell of a 3G or 2G legacy network.) The UE 302 can use a physical layer measurement and reporting component to determine a reference signal received power (RSRP) along with a received signal strength indicator (RSSI) for the serving eNodeB 304 and for other neighboring eNodeBs, e.g., neighboring network base stations that the UE 302 has detected as a result of a previous network search procedure and/or based on information provided by the serving eNodeB 304. As would be understood by those skilled in the art, an RSRP performance metric can be defined as an average received signal power of RSs received by the UE 302 from the serving eNodeB 304 over a particular time interval. The UE 302 can also measure other performance metrics, such as RRSI, RSRQ, RSCP, SNR, SINR, BER, BLER, and/or other physical layer (or "lower" layer) metrics that can characterize, at least in part, a radio frequency communication channel between the UE 302 and an eNodeB, such as eNodeB 304. When the UE 302 operates under marginal radio frequency performance metric conditions, e.g., at or near an edge of an LTE/LTE-A network cell 104/106 with low signal strength and/or with high interference levels due to overlapping cells and/or network loading, the UE 302 can experience unstable voice connections through the LTE/LTE-A network cell 104/106. In some circumstances, the performance metrics can have higher values than those required by the LTE/LTE-A network to switch to a different cell, e.g., by reselection or handover, yet may have lower values than those needed to maintain a consistent voice connection. In particular, when interference levels are high, including in the resource elements that carry the reference signals used to measure a strength of the reference signal, such as an RSRP, the UE 302 may not report poor signal conditions to the eNodeB 304 (as the RSRP can satisfy network-defined thresholds) even though other performance metrics, such as the SINR can be sufficiently low to result in a poor quality connection. As described further herein, the UE 302 can measure the SINR (and/or other similar signal quality performance metrics, particularly at the physical layer) to determine whether the connection with the cell of the eNodeB 304 should be transferred to another cell. In some embodiments, the UE 302 locates and measures neighbor cells when the SINR of the serving cell falls below a UE-defined SINR threshold, and when channel quality (such as both RSRP and SINR) for the neighbor cell exceeds the network-defined RSRP threshold and the UE-defined SINR threshold, the UE 302 sends a modified measurement report to the eNodeB 304 to trigger a handover to a neighbor cell.

Figure 4:
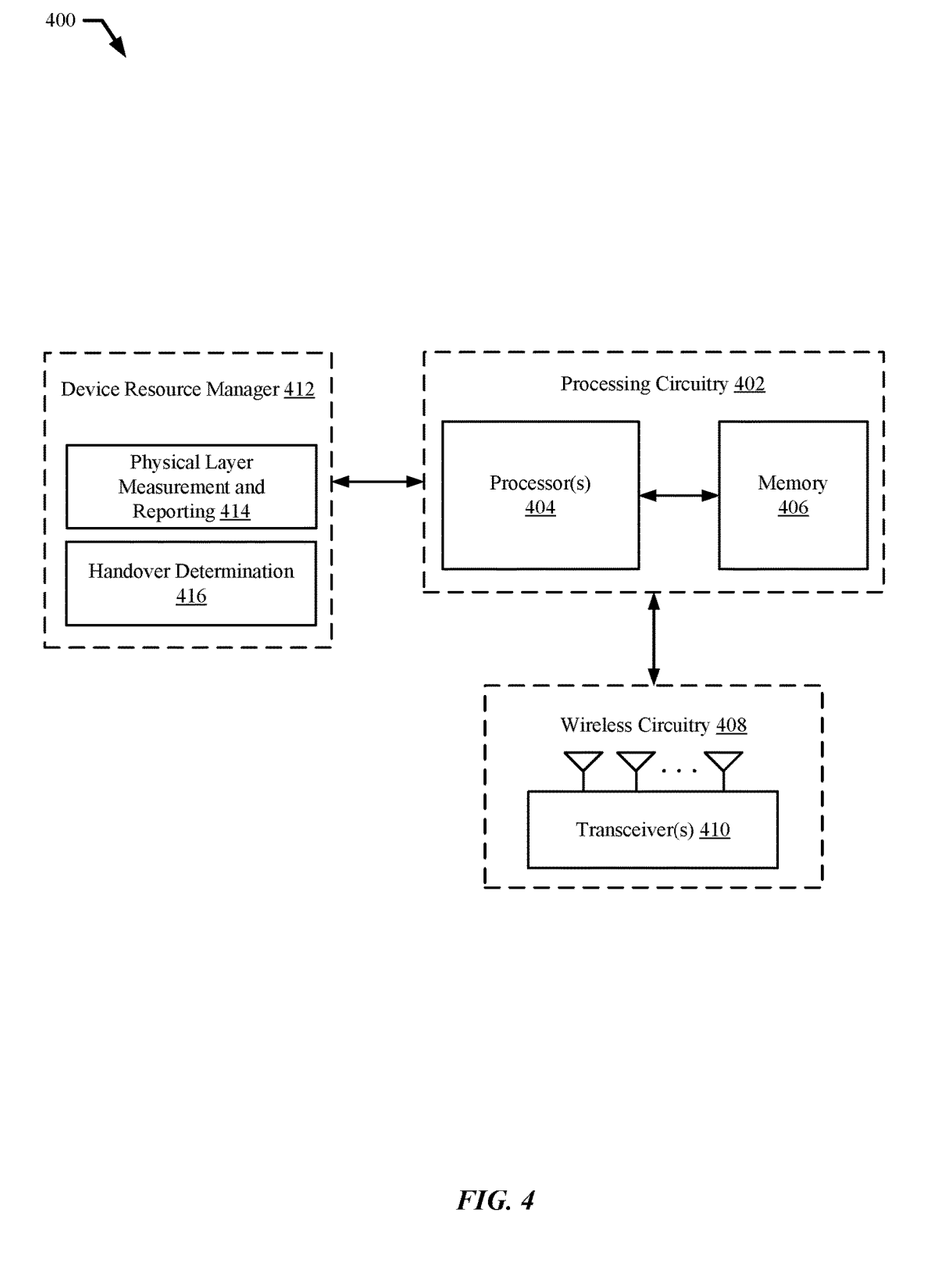
FIG. 4 illustrates a block diagram of elements of a wireless communication device including a device resource manager having a physical layer measurement and reporting component and a handover determination component, in accordance with some embodiments.

FIG. 4 illustrates a block diagram 400 of a set of components of a communication device (e.g., an LTE or LTE-A compliant UE 102) including wireless circuitry 408 including one or more transceiver(s) 410, as well as, a device resource manager 412 including a physical layer measurement and reporting component 414 and a handover determination component 416, in accordance with some embodiments of the disclosure. In various configurations, the communication device illustrated by the block diagram 400 of FIG. 4 can include processing circuitry 402 that can perform various handover determination procedures, e.g., whether to provide measurement reports with unmodified values or with modified values to an associated eNodeB 304 of a serving cell of an LTE/LTE-A network to trigger a handover. The processing circuitry 402 can function in conjunction with elements of the device resource manager 412 to measure/estimate performance metrics for communication channel(s) between the communication device and one or more cells of one or more networks in which the communication device operates, including the serving cell and one or more neighbor cells. The processing circuitry 402 can cause the communication device to send unmodified or modified measurement reports to the LTE/LTE-A network based on measurements and an evaluation performed by the device resource manager 412 for signals received through the wireless circuitry 408.

The processing circuitry 402 of the communication device can use the physical layer measurement and reporting component 414 to perform various wireless signal received power and received quality measurements (e.g., of various RSs to determine RSRP and SINR metrics) of cells of one or more eNodeBs 304. The processing circuitry 402 of the communication device can also use the physical layer measurement and reporting component 414 to report various radio signal measurements to the UE's serving cell of the eNodeB 304. The processing circuitry 402 of the communication device 400 can use the handover determination component 416 of the device resource manager 412 to carry out various procedures in response to determining whether to trigger a handover, such as when a serving cell's quality is poor and a neighbor cell can provide a better quality connection for the device. In this regard, the processing circuitry 402 can be configured to perform and/or control performance of one or more functionalities of the communication device 400 in accordance with various implementations, and thus, the processing circuitry 402 can provide functionality for performing proactive handover procedures, in accordance with various scenarios that are described further herein. The processing circuitry 402 may further be configured to perform data processing, application execution and/or other control and management functions according to one or more embodiments of the disclosure.

A communication device, or portions or components thereof, such as the processing circuitry 402, can include one or more chipsets, which can respectively include any number of coupled microchips thereon. The processing circuitry 402 and/or one or more other components of the communication device may also be configured to implement functions associated with various enhanced device mobility functions using multiple chipsets. In some scenarios, the communication device may be associated with or employed as a UE 102 that can operate in an LTE network cell 106 or an LTE-A network cell 104, in accordance with an LTE/LTE-A wireless communication protocol, or in a legacy 3G or 2G network cell 114/116 in accordance with a legacy wireless communication protocol. The communication device may include one or more chipsets configured to enable the communication device to communicate via the LTE/LTE-A network 104/106 of the wireless communication system 100.

In various scenarios, the processing circuitry 402 of the communication device may include one or more processor(s) 404 and a memory component 406. The processing circuitry 402 may be in data communication with, or otherwise coupled to, wireless circuitry 408 having one or more transceivers 410 for wireless communication. In some implementations, the wireless circuitry 408 including the one or more transceivers 410 may be configured to communicate using different RAT types. For instance, in some embodiments the wireless circuitry 408 may be configured to communicate using an LTE RAT, and in other embodiments, the wireless circuitry 408 may be configured to communicate using an LTE-A RAT. Further, the wireless circuitry 408 may also be configured to communicate using any number of different 3G legacy RAT types, as well as any number of 2G legacy RAT types.

In some embodiments, the processor(s) 404 may be configured in a variety of different forms. For example, the processor(s) 404 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 404 of the communication device can be coupled to and/or configured in operative communication with each other, and these components may be collectively configured to perform one or more procedures of the communication device as described herein in the form of an LTE-compliant UE 102.

In some implementations, the processors 404 can be configured to execute instructions that may be stored in the memory 406 or that can be otherwise accessible to the processors 404 in some other device memory. As such, whether configured as, or in conjunction with, hardware or a combination of hardware and software, the processors 404 of the processing circuitry 402 may be capable of performing operations according to various implementations described herein when configured accordingly.

In various embodiments, the memory 406 of the processing circuitry 402 may include multiple memory devices that can be associated with any common volatile or non-volatile memory type. In some scenarios, the memory 406 may be associated with a non-transitory computer-readable storage medium that can store various computer program instructions which may be executed by the processor(s) 404 during normal program executions. In this regard, the memory 406 can be configured to store information, data, applications, instructions, or the like, for enabling the communication device to carry out various functions in accordance with one or more embodiments of the disclosure. In some implementations, the memory 406 may be in communication with, and coupled to, the processor(s) 404 of the processing circuitry 402, as well as one or more system buses for passing information between and amongst the different device components of the communication device.

It should be appreciated that not all of the components, device elements, and hardware illustrated in and described with respect to the communication device of FIG. 4 may be essential to this disclosure, and thus, some of these items may be omitted, consolidated, or otherwise modified within reason. Additionally, in some implementations, the subject matter associated with the communication device can be configured to include additional or substitute components, device elements, or hardware, beyond those depicted within FIG. 4.

Figure 5:
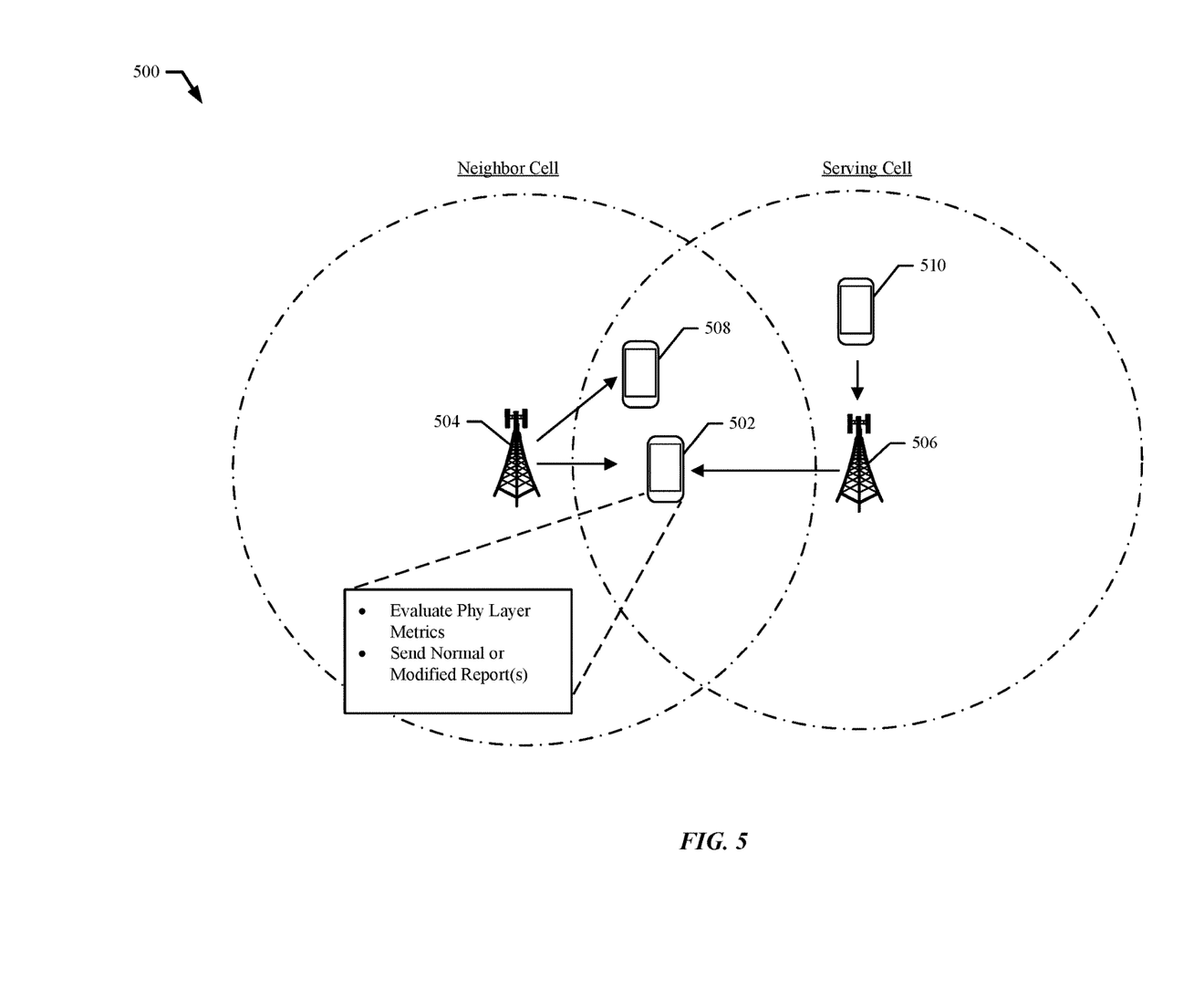
FIG. 5 illustrates a network diagram depicting a scenario where a UE operates in an overlapping region covered by both a serving network cell and a neighbor network cell, in accordance with some embodiments.

FIG. 5 illustrates a network diagram 500 depicting a scenario where a UE 502 moves into (and/or operates within) a region of a serving 4G LTE network cell associated with a serving eNodeB 506, the region overlapping with a neighbor cell associated with a neighbor eNodeB 504. The UE 502 can evaluate performance metrics for the serving cell to determine whether to measure the neighbor cell to determine whether the neighbor cell can provide a more suitable (higher performing) connection than the serving cell. In some embodiments, when the performance metrics measured for the serving cell indicate an established connection may be unstable, the UE 502 can send a modified measurement report to the serving cell 506 in order to trigger a handover to a better cell, such as when the neighbor cell has higher signal quality (e.g., SINR) than the serving cell, a high enough signal quality to meet a UE-defined signal quality threshold, and has a high enough signal strength (e.g., RSRP) to satisfy a network-defined signal strength threshold.

As would be understood by those skilled in the art, path loss (a.k.a., path attenuation) is associated with a reduction in power density of a radio signal as it propagates through space. Path loss is influenced by geographic terrain, environment, and a distance between a transmitter (e.g., eNodeB 506) and a receiver of a wireless communication device (e.g., the UE 502), and the height and location of or one or more transmitting radio antennas (e.g., antennas associated with the wireless circuitry of the 4G LTE network serving cell's eNodeB 506).

In some embodiments, the UE 502 may be configured to periodically measure/monitor performance metrics, such as RSRP, of its serving eNodeB 506, as well as performance metrics, such as RSRP(s), of one or more neighbor base stations 504, using its physical layer measurement and reporting component 414. For a normal handover based on measurement reporting events for an LTE/LTE-A network, the UE 502 may identify the occurrence of a network measurement reporting event that could be associated with a breach of a network-defined threshold (e.g., any of the handover/reselection thresholds listed in Table 1, below). Alternatively, the UE 502 may experience a relatively strong signal from the eNodeB 506 of the serving cell, in which case the network-defined thresholds may not be breached. At the same time, the UE 502 may experience a relatively high level of interference, e.g., from signals from other eNodeBs of neighbor cells, such as from the eNodeB 504 of the neighbor cell. The eNodeB 504 may be transmitting reference signals on (or nearly on) the same subcarrier frequencies (and possibly on the same resource element time-frequency positions) as the eNodeB 506, which can result in interference at the UE 502. The eNodeB 504 of the neighbor cell may also communicate data to an associated UE 508, and the data signals sent to UE 508 may interfere with reception of reference signals or data at the UE 502. Moreover, a high number of UEs in the serving cell and/or in the neighbor cell(s) can result in a high network loading level, which may result in high levels of interference in either the downlink direction from the eNodeB 506 to the UE 502 or in the uplink direction from the UE 502 to the eNodeB 506.

By way of example, Table 1 lists various measurement reporting events associated with 3GPP LTE Release 8 and 3GPP LTE-A Release 10 wireless communication protocol specifications.

TABLE 1

LTE and LTE-A Measurement Reporting (MR) Events

| | Intra-system MR events: |
|---|---|
| A1 | Serving cell > Threshold |
| A2 | Serving cell < Threshold |
| A3 | Neighbor cell > Serving cell by an offset |
| A4 | Neighbor cell > Threshold |
| A5 | Serving cell < Threshold 1; Neighbor cell > Threshold 2 |
| A6 | Neighbor cell > Secondary cell by an offset |
| | Inter-system MR events: |
| B1 | Inter-system Neighbor cell > Threshold |
| B2 | Serving cell < Threshold 1; Inter-system Neighbor cell > Threshold 2 |

Figure 6A:
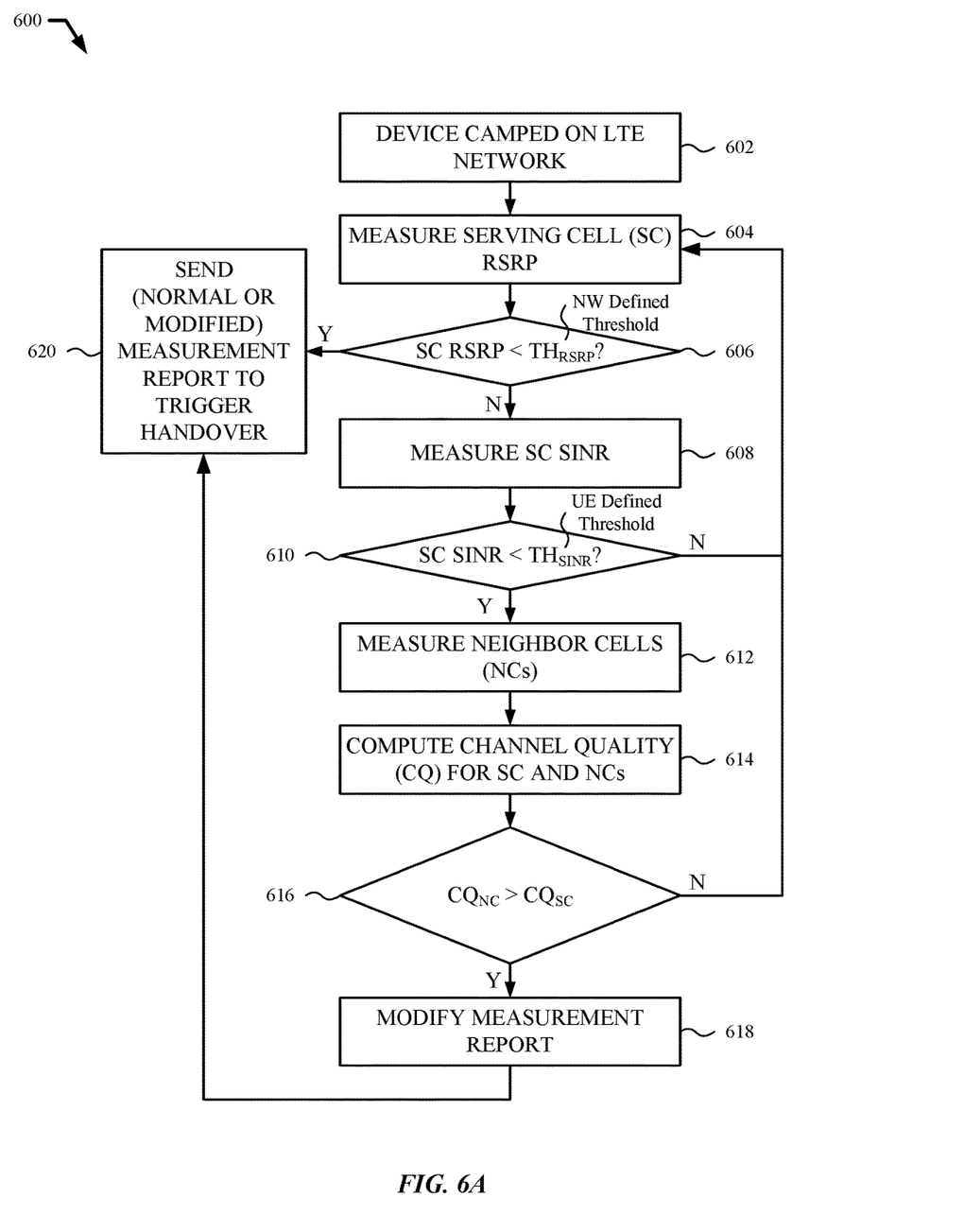
FIGS. 6A and 6B illustrate a flowchart depicting an example method for triggering a handover based on signal quality by a wireless communication device in communication with a serving cell of an eNodebB, in accordance with some embodiments.

FIG. 6A illustrates a flowchart 600 depicting an example method for triggering a handover based on signal quality by a wireless communication device in communication with a serving cell of an eNodeB. In step 602, the wireless communication device is camped on a serving cell of an 4G LTE/LTE-A network. In step 604, the wireless communication device measures a signal strength, e.g., the RSRP, of the serving cell. In step 606, the wireless communication device compares the signal strength, e.g., the RSRP, of the serving cell to a network-defined threshold, e.g., $TH_{RSRP}$, to determine whether the signal strength of the serving cell falls below the network-defined threshold (such as in accordance with an A2 event as listed in Table 1 above.) When the signal quality of the serving cell does fall below the network-defined signal strength threshold, e.g., when conditions for an A2 event are satisfied, the wireless communication device can proceed to step 620 and send a normal (unmodified) measurement report to the serving cell of the eNodeB to trigger handover. When the signal strength of the serving cell does not fall below the network-defined threshold, the wireless communication device, in step 608, measures a signal quality of the serving cell, e.g., the SINR of the serving cell. In some embodiments, the wireless communication device computes the SINR of the serving cell by estimating an interference-plus-noise level for the serving cell using information derived from decoding the reference signals and combines such information with signal strength measurements for the reference signals to determine and SINR value on each resource element, in a set of resource blocks, on which the reference signals are communicated by the serving cell of the eNodeB to the wireless communication device. In some embodiments, the wireless communication device interpolates the determined SINR values for other resource elements, in the set of resource blocks, on which data (and not reference signals) are communicated by the serving cell of the eNodeB to the wireless communication device (and/or to other wireless communication devices associated with the serving cell of the eNodeB). The wireless communication device compares SINR for the set of resource blocks to a UE-defined signal quality threshold, e.g., $TH_{SINR}$, the determine whether the signal quality of the serving cell, as measured by the SINR, falls below the UE-defined signal quality threshold. When the computed SINR for the serving cell equals or exceeds the UE-defined signal quality threshold, the wireless communication device concludes that both the signal strength of the serving cell and the signal quality of the serving cell, which can be referred to jointly as a channel quality or a set of physical layer performance metrics for the serving cell, suffice to provide a stable connection with adequate performance for the wireless communication device. When the SINR of the serving cell falls below the UE-defined signal quality threshold, in step 612, the wireless communication device measures one or more neighbor cells, which can be located based on a search by the wireless communication device and/or based on information about neighbor cells provided by the serving cell. The wireless communication device can measure both a signal strength, e.g., RSRP (or equivalent signal strength metric for a non-LTE cell), and a signal quality, e.g., SINR, of each neighbor cell.

Figure 6B:
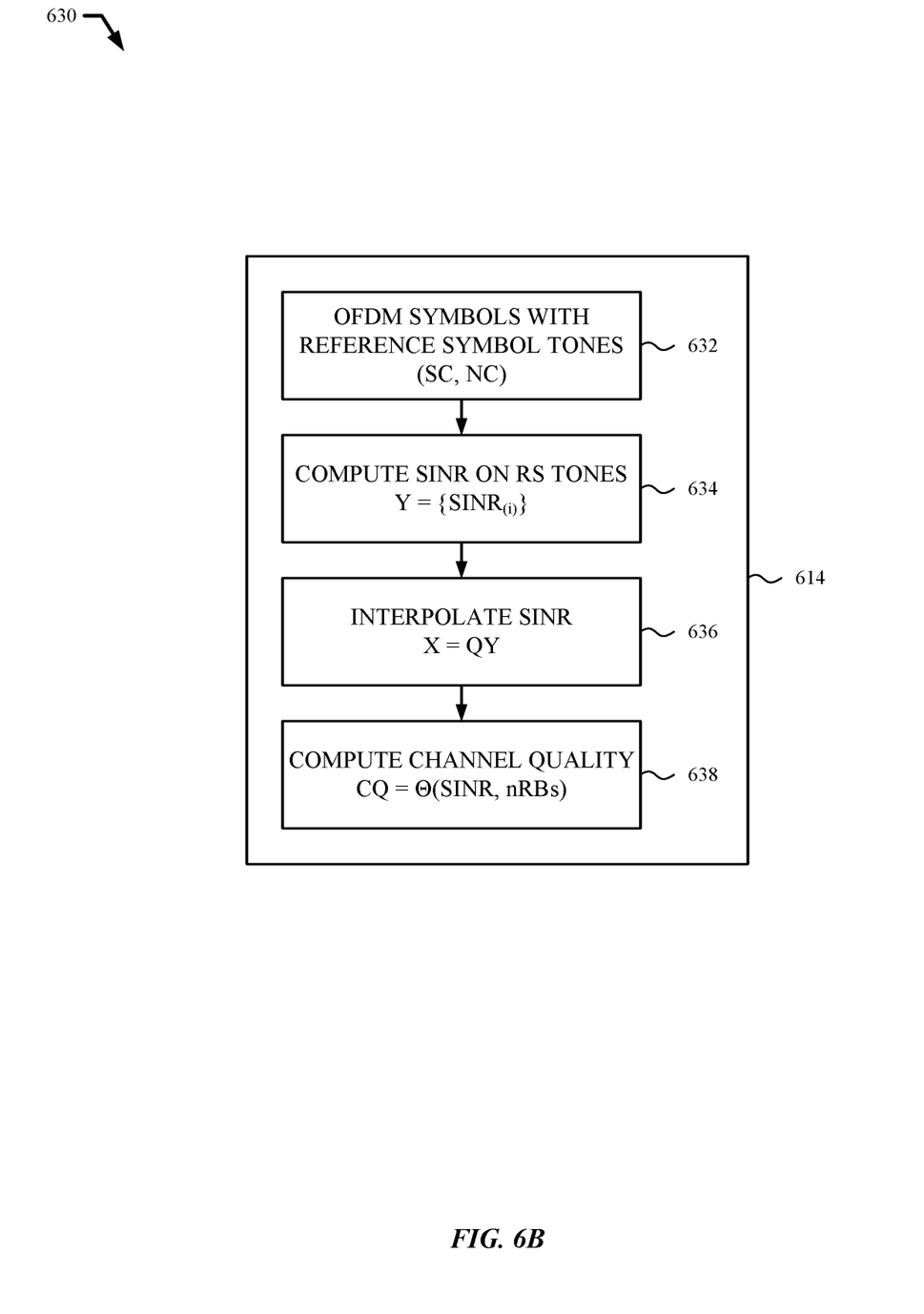

In step 614, the wireless communication device computes a channel quality metric for the serving cell and for each neighbor cell based on the computed SINR for each respective cell across multiple resource blocks. FIG. 6B illustrates a diagram 630 of a set of steps that the wireless communication device can perform to compute a channel quality metric for a cell, e.g., for the serving cell and for each of the neighbor cells. In step 632, the wireless communication device collects a set of received orthogonal frequency division multiplexing (OFDM) symbols that contain reference symbols on various subcarriers (tones) for both the serving cell and for at least one neighbor cell (e.g., OFDM symbols on which reference signals are sent by the serving cell and the neighbor cells contained in particular resource elements as illustrated for example in FIG. 2). As can be noted in FIG. 2, a subset of subcarriers of each resource block contain reference symbols in particular resource elements for particular OFDM symbols. In step 634, the wireless communication device computes an SINR value for each subcarrier (tone) that contains reference symbols. Multiple OFDM symbols that carry reference signals spanning a time interval can be used to determine an average SINR value on each subcarrier. As a result of the computation in step 634, the wireless communication device creates a set of SINR values across different subcarriers that contain reference symbols. In step 636, the wireless communication device interpolates the computed SINR values to obtain SINR values for all subcarriers of interest that span a frequency band used by the respective cell, including subcarriers that contain data but do not contain reference symbols. In some embodiments, the wireless communication device interpolates the SINR using time-domain filtering, frequency-domain filtering, convolution, or other filtering techniques to fill in SINR values for the subcarriers between those subcarriers that carry reference symbols. In step 638, the wireless communication device computes a channel quality for the serving cell and for each neighbor cell based on a combination of the computed SINR for the respective cell and a number of resource blocks (nRBs) that equal or exceed an SINR value. In some embodiments, the wireless communication device evaluates a level of loading within each cell in addition to the SINR. In some embodiments, the wireless communication device evaluates eligibility of a neighbor cell with respect to channel quality including cell loading to determine whether the neighbor cell is suitable for providing a stable, quality connection for the wireless communication device. In some embodiments, the wireless communication device computes an SINR value for each resource block used by a cell and counts the number of RBs that equal or exceed an SINR threshold value.

In step 616, the wireless communication device compares the computed channel quality metric of the serving cell and of the neighbor cells to determine whether at least one neighbor cell has a higher computed channel quality than the serving cell. When more than one neighbor cell has higher computed channel quality than the computed channel quality of the neighbor cell, the wireless communication device can compare neighbor cells to determine a best neighbor cell from a set of candidate neighbor cells for handover. In some embodiments, the wireless communication device compares the channel quality metrics of the serving cell and the neighbor cells determined in step 638 of FIG. 6B to determine whether at least one neighbor cell has a better channel quality metric value than the serving cell. The channel quality metric value for each cell can be based on a combination of the SINR computed for the cell and a cell loading.

In some embodiments, in step 616, the wireless communication device determines whether at least one neighbor cell can provide a higher channel quality than the serving cell, e.g., based on the neighbor cell having a signal strength that satisfies the network-defined signal strength threshold, $TH_{RSRP}$, and the neighbor cell having a signal quality that exceeds the UE-defined signal quality threshold, $TH_{SINR}$. As the serving cell does not satisfy the UE-defined signal quality threshold, the neighbor cell provides a higher signal quality compared with the serving cell. In some embodiments, the wireless communication device compares the computed channel quality of step 638 of FIG. 6B to find a best candidate neighbor cell that outperforms the serving cell and also confirms that the best candidate neighbor cell can meet the network-defined signal strength threshold $TH_{RSRP}$ and the UE-defined signal quality threshold $TH_{SINR}$.

In step 618, the wireless communication device derives a measurement report that includes one or more modified values for measurements of the serving cell reported to the serving cell by the wireless communication device. The modified measurement report is derived to trigger a handover by the eNodeB to switch the wireless communication device from the serving cell to the neighbor cell. In some embodiments, the wireless communication device modifies measurement report values to indicate that an A2 event condition and/or an A3 event condition is met.

In some embodiments, the wireless communication device can modify values for downlink channel quality reported to the eNodeB, e.g. the reported RSRP of the serving cell falling below the network-defined threshold or another channel quality indicator (CQI) value, so that the eNodeB will handover the UE from the serving cell to the neighbor cell. In some embodiments, the wireless communication device accounts for an A3 event condition that triggers a handover from the serving cell to a neighbor cell. The A3 event condition can be defined by the 4G LTE/LTE-A network and can include a cell-specific offset for the serving cell ($O_{serv,cell}$), a frequency-specific offset for the serving cell ($O_{serv,freq}$), a cell-specific offset for the neighbor cell ($O_{neigh,cell}$), a frequency-specific offset for the neighbor cell ($O_{neigh,freq}$), a hysteresis value (Hyst), and an overall offset value (Offset). The A3 event can be triggered when the neighbor cell is better than the serving cell at least by the overall offset value (accounting for the other offsets and hysteresis according to the following equation.)

$$RSRP_{neigh}+O_{neigh,cell}+O_{neigh,freq}-\text{Hyst}>RSRP_{serv}+O_{serv,cell}+O_{neigh,cell}+\text{Offset}$$

The wireless communication device can derive values for reporting the RSRP of the serving cell and the neighbor cell to indicate to the eNodeB that the condition for the A3 event is true. The wireless communication device can provide the modified measurement report when the signal quality, e.g., the SINR of the neighbor cell exceeds the UE-defined signal quality threshold (to ensure selecting an adequate neighbor cell to which to handover. The eNodeB of the 4G LTE/LTE-A network will trigger a handover causing the wireless communication device to handover to the neighbor cell, while maintaining any active connections, which should have improved channel quality and therefore more stable connection, lower error rates, higher audio quality, etc.

In some embodiments, the wireless communication device can use SINR measurements to determine a channel quality indicator (CQI) reported to the eNodeB, which can influence the modulation and coding scheme (MCS) selected by the eNodeB for downlink transmission to the wireless communication device. CQI reporting from the wireless communication device to the eNodeB can include precoding matrix indicator (PMI) and rank indicator (RI) values. Higher CQI values reported by the wireless communication device can result in higher MCS values being assigned to the wireless communication device. The wireless communication device can account for the estimated SINR and a target maximum block error rate (BLER), e.g., BLER<10%, when reporting CQI to the eNodeB. The SINR can provide a better estimate of what data rates and stability a connection can provide rather than a signal strength, such as the RSRP, alone.

Figure 7:
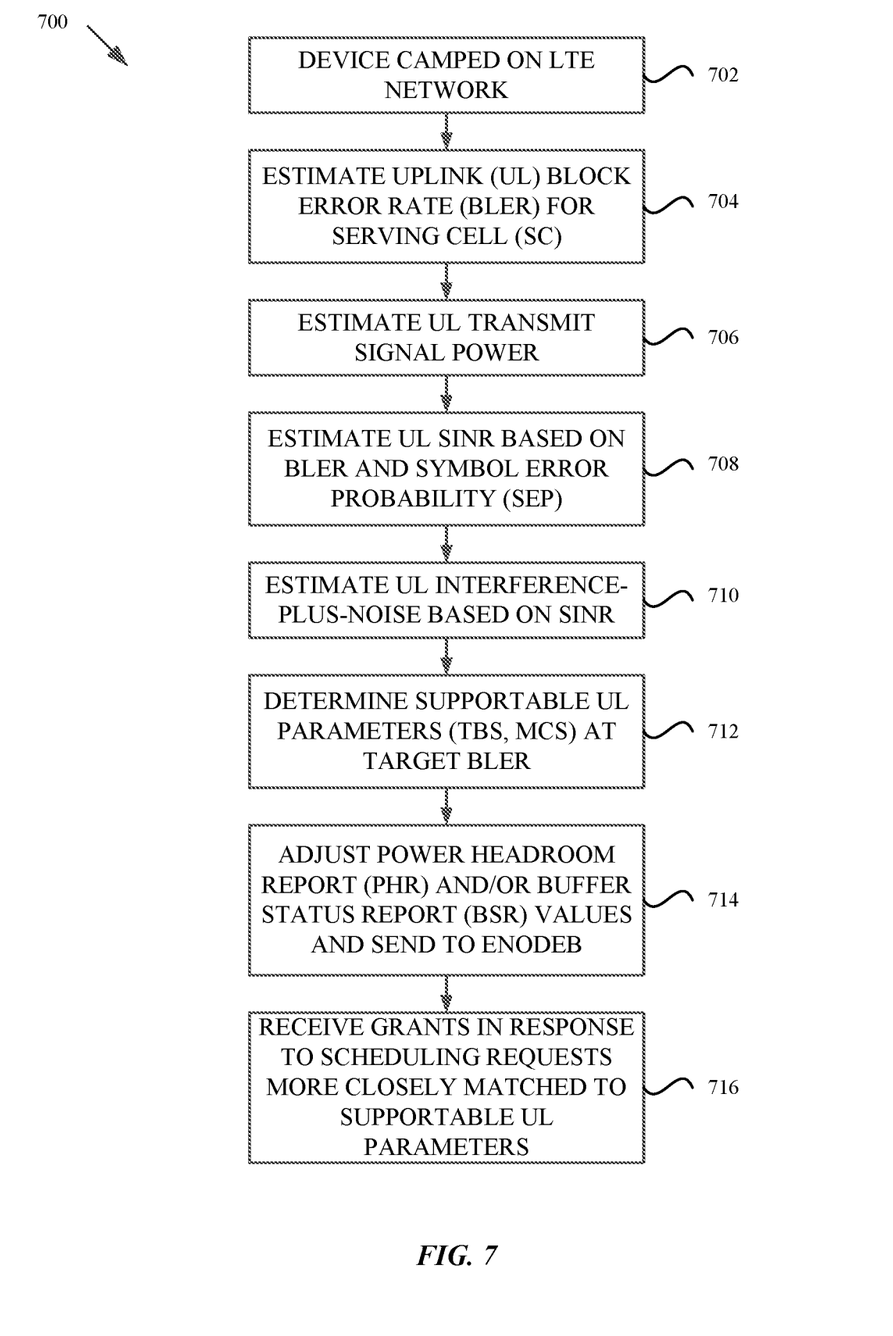
FIG. 7 illustrates a flowchart depicting an example method for adjusting uplink data transfers from a wireless communication device to a serving cell based on estimates of uplink interference at the serving cell, in accordance with some embodiments.

FIG. 7 illustrates a flowchart 700 depicting an example method for adjusting uplink data transfers from a wireless communication device to a serving cell associated with an eNodeB based on estimates of uplink interference at the serving cell. In step 702, the wireless communication device is associated with and connected to a serving cell of an eNodeB of a 4G LTE/LTE-A network. In step 704, the wireless communication device estimates an uplink (UL) block error rate (BLER) for uplink transmissions sent to the serving cell. The wireless communication device can use acknowledgement (ACK) messages and negative acknowledgement (NACK) messages received from the serving cell in response to uplink data transmissions sent to the serving cell by the wireless communication device. In some embodiments, the wireless communication device can determine that a data packet that is positively acknowledged (with an ACK) is received correctly and a data packet that is negatively acknowledge (with a NACK) is received incorrectly and knowing the size of the data packet transmitted estimate a block error rate (BLER) for uplink data transmissions to the serving cell. In step 706, the wireless communication device estimates a level of uplink transmit signal power received at the serving cell of the eNodeB. In some embodiments, using an estimate of a downlink communication channel path loss from the eNodeB to the wireless communication device, the wireless communication device can estimate an equivalent uplink communication channel path loss, and with this estimated uplink path loss and knowing the level of transmit power sent by the wireless communication device, estimate the amount of uplink transmit signal power that reaches the serving cell of the eNodeB from the wireless communication device. In step 708, the wireless communication device can estimate an uplink signal-to-interference-plus-noise ratio (SINR) at the serving cell of the eNodeB based on the estimated BLER and using a symbol error probability (SEP) table and/or an algorithmic function relating BLER values to SINR values. In some embodiments, the SEP table can be calculated offline and pre-stored in the wireless communication device. In step 710, the wireless communication device can estimate a level of uplink interference-plus-noise at the serving cell of the eNodeB based on the estimated SINR at the serving cell and the estimated receive uplink transmit signal power at the serving cell. Based on the estimated interference-plus-noise at the serving cell and the estimated SINR, the wireless communication device can determine whether to provide feedback (e.g., using measurement reports, channel quality indicators, or other information provided regularly to the serving cell by the wireless communication device) to the serving cell to change the transmit signal power level of the wireless communication device (up or down based on transmit signal power control commands sent to the wireless communication device by the eNodeB), to change the uplink data parameters (e.g., a transport block size (TBS) and/or a modulation and coding scheme (MCS) used for uplink transmission of data), or to trigger a handover to another cell.

In step 712, the wireless communication device determines a range of supportable uplink parameters, e.g., TBS and/or MCS for UL data transmission, based on achieving a target BLER (e.g., less than 1%) with the level of interference-plus-noise estimated to exist at the serving cell and based on a range of transmit power levels that the wireless communication device can send (e.g., knowing the amount of transmit power headroom available and to operate in accordance with applicable wireless communication protocols that limit total UL transmit power levels). The 4G LTE/LTE-A wireless communication protocols specify a mapping between uplink transmit power levels and supportable MCS values. Based on an estimated UL BLER, the wireless communication device can determine a probability of error for UL transmissions that will results for various TBS values. The wireless communication device can adjust information sent to the eNodeB, e.g., power headroom report (PHR) values and/or buffer status report (BSR) values, to influence the choice of TBS and MCS used by the eNodeB for scheduled grants sent to the wireless communication device in response to scheduling requests. When uplink transmissions of particular TBS and MCS values sent from the wireless communication device to the serving cell of the eNodeB result in a higher BLER than a target BLER, the TBS and/or the MCS values may be too high. The wireless communication device can adjust BSR values to underrun the buffer and report fewer bytes pending for uplink transmission to the serving cell. The wireless communication device can also underreport available power headroom, e.g., report lower PHR values, to indicate less power headroom is available. In step 714, the wireless communication device sends to the eNodeB a set of adjusted PHR and/or BSR values. As a result, the eNodeB will schedule TBS values for future UL scheduled grants that are smaller and may also use lower MCS values resulting in improved BLER for the UL transmissions that use the smaller block sizes and/or less dense constellations (or otherwise adjusting coding rate values). While the maximum throughput in the UL direction can be lowered by these adjustments, the BLER can also be lowered, resulting in an improved connection with fewer errors, fewer NACKs, and fewer retransmissions. In some embodiments, the eNodeB can also instruct the wireless communication device to lower its uplink transmit power which can reduce interference from the wireless communication device into other wireless communication devices that share the same frequency spectrum. In step 716, the wireless communication device receives grants in response to scheduling requests that include TBS and/or MCS values that more closely match the range of supportable UL parameters determine in step 712. In some embodiments, the wireless communication device can repeat the estimation and calculation of steps 704 to 712 and send further adjusted PHR and/or BSR values to the eNodeB to achieve the target BLER for UL transmissions.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method to trigger a handover of a mobile device from a serving cell to a neighbor cell based on signal quality, the method comprising:
by the mobile device:
measuring a signal strength of the serving cell;
sending to the serving cell a normal measurement report, when the signal strength of the serving cell falls below a network-defined signal strength threshold; and
when the signal strength of the serving cell does not fall below the network-defined threshold:
measuring a signal quality of the serving cell;
when the signal quality of the serving cell falls below a mobile device defined signal quality threshold, computing channel quality metrics for the serving cell and for at least one neighbor cell based at least in part on measurements of the serving cell and of the at least one neighbor cell; and
sending a modified measurement report to the serving cell, when a channel quality metric for a neighbor cell of the at least one neighbor cell exceeds a corresponding channel quality metric for the serving cell,
wherein the channel quality metrics are based at least in part on a combination of a computed signal-to-interference-plus-noise ratio (SINR) and a number of resource blocks (RBs) that equal or exceed an SINR threshold value.

2. The method of claim 1, wherein the mobile device computes the channel quality metric for a cell by at least:
computing an SINR value for each resource block (RB) used by the cell; and
counting the number of RBs used by the cell for which the corresponding computed SINR value equals or exceeds the SINR threshold value.

3. The method of claim 1, wherein the channel quality metrics further comprise an estimate of cell loading.

4. The method of claim 1, wherein the serving cell and the neighbor cell operate in accordance with a long term evolution (LTE) or long term evolution advanced (LTE-A) radio access technology (RAT).

5. The method of claim 1, wherein the signal strength comprises a reference signal receive power (RSRP).

6. The method of claim 1, wherein the network-defined signal strength threshold comprises an A2 event threshold.

7. The method of claim 1, wherein the modified measurement report comprises an indication of an A3 event condition being met, wherein performance of the neighbor cell exceeds performance of the serving cell.

8. The method of claim 1, wherein the modified measurement report comprises adjusted channel quality indicator (CQI) values based on SINR measurements and a target maximum block error rate (BLER) of less than ten percent.

9. A mobile device comprising:
one or more antennas; and
processing circuitry comprising one or more processors communicatively coupled to a storage medium storing instructions that, when executed on the one or more processors, cause the mobile device to perform a method to trigger a handover of the mobile device from a serving cell to a neighbor cell including:
measuring a signal strength of the serving cell;
sending to the serving cell a normal measurement report, when the signal strength of the serving cell falls below a network-defined signal strength threshold; and
when the signal strength of the serving cell does not fall below the network-defined threshold:
measuring a signal quality of the serving cell;
when the signal quality of the serving cell falls below a mobile device defined signal quality threshold, computing channel quality metrics for the serving cell and for at least one neighbor cell based at least in part on measurements of the serving cell and the at least one neighbor cell; and
sending a modified measurement report to the serving cell, when a channel quality metric for a neighbor cell of the at least one neighbor cell exceeds a corresponding channel quality metric for the serving cell,
wherein the channel quality metrics are based at least in part on a combination of a computed signal-tointerference-plus-noise ratio (SINR) and a number of resource blocks (RBs) that equal or exceed an SINR threshold value.

10. The mobile device of claim 9, wherein the mobile device computes the channel quality metric for a cell by at least:
computing an SINR value for each resource block (RB) used by the cell; and
counting the number of RBs used by the cell for which the corresponding computed SINR value equals or exceeds the SINR threshold value.

11. The mobile device of claim 9, wherein the channel quality metrics further comprise an estimate of cell loading.

12. The mobile device of claim 9, wherein the network-defined signal strength threshold comprises an A2 event threshold.

13. The mobile device of claim 9, wherein the modified measurement report comprises an indication of an A3 event condition being met, wherein performance of the neighbor cell exceeds performance of the serving cell.

14. The mobile device of claim 9, wherein the modified measurement report comprises adjusted channel quality indicator (CQI) values based on SINR measurements and a target maximum block error rate (BLER) of less than ten percent.

15. An apparatus configurable for operation in a mobile device, the apparatus comprising:
one or more processors communicatively coupled to a storage medium storing instructions that, when executed on the one or more processors, cause the mobile device to perform a method to trigger a handover of the mobile device from a serving cell to a neighbor cell including:
measuring a signal strength of the serving cell;
sending to the serving cell a normal measurement report, when the signal strength of the serving cell falls below a network-defined signal strength threshold; and
when the signal strength of the serving cell does not fall below the network-defined threshold:
measuring a signal quality of the serving cell;
when the signal quality of the serving cell falls below a mobile device defined signal quality threshold, computing channel quality metrics for the serving cell and for at least one neighbor cell based at least in part on measurements of the serving cell and the at least one neighbor cell; and
sending a modified measurement report to the serving cell, when a channel quality metric for a neighbor cell of the at least one neighbor cell exceeds a corresponding channel quality metric for the serving cell,
wherein the channel quality metrics are based at least in part on a combination of a computed signal-to-interference-plus-noise ratio (SINR) and a number of resource blocks (RBs) that equal or exceed an SINR threshold value.

16. The apparatus of claim 15, wherein the mobile device computes the channel quality metric for a cell by at least:
computing an SINR value for each resource block (RB) used by the cell; and
counting the number of RBs used by the cell for which the corresponding computed SINR value equals or exceeds the SINR threshold value.

17. The apparatus of claim 15, wherein the channel quality metrics further comprise an estimate of cell loading.

18. The apparatus of claim 15, wherein the network-defined signal strength threshold comprises an A2 event threshold.

19. The apparatus of claim 15, wherein the modified measurement report comprises an indication of an A3 event condition being met, wherein performance of the neighbor cell exceeds performance of the serving cell.

20. The apparatus of claim 15, wherein the modified measurement report comprises adjusted channel quality indicator (CQI) values based on SINR measurements and a target maximum block error rate (BLER) of less than ten percent.

* * * * *